Patented Sept. 9, 1941

2,255,313

UNITED STATES PATENT OFFICE 2,255,313

ETHYLENIC-ALPHA-BETA SYNTHETIC RESINS AND PROCESS OF MAKING SAME

Carleton Ellis, Montclair, N. J., assignor to Ellis-Foster Company, a corporation of New Jersey No Drawing. Application August 6, 1937, Serial No. 157,729

6 Claims. (Cl. 260—42)

This invention relates to molding compositions comprising a resinous material which cures spontaneously with which may be present a filler which acts thereon as a retardant of spontaneous cure at ordinary temperatures but not under hot-molding conditions, said filler being preferably of the fibrous type such as cellulose or asbestos. The resulting advantage is that compositions containing resin and filler remain heat-moldable during storage. In particular the invention relates to compositions adapted for hot-molding comprising a filler possessing the above mentioned quality and a binder which contains as essential components a maleic-polyhydric alcohol ester preferably of low acid number, a polymerizable alpha-substituted ethylene body and a curing catalyst therefor.

This is a continuation in part of my copending applications Serial 148,733, filed June 17, 1937; Serial 132,181, filed March 20, 1937; and Serial 81,028, filed May 21, 1936 (the latter now being Patent 2,195,362, March 26, 1940).

The general procedure for making the compositions herein used is to prepare a substantially linear polyhydric alcohol ester of an unsaturated polybasic acid material of the maleic type and to incorporate this resinous material with a liquid substituted-ethylene body of resin-forming characteristics which is co-polymerizable and miscible therewith (e. g., a vinyl compound), along with a catalyst for subsequent cure. The syrup thus prepared is intimately mixed with a filler, preferably of the cellulose type, to form the molding composition. Plasticizers, dyes, pigments or perfumes may be included as desired. The composition thus formed possesses storage-stability when kept at ordinary temperatures and when placed in a mold and subjected to heat and pressure, forms a heat-set article.

Maleic anhydride is the preferred unsaturated polybasic acid material which is esterified, but maleic acid, fumaric acid, or itaconic and citraconic acid and anhydride may be used instead. Fumaric acid gives a quicker-curing ester than maleic. Unless suitably modified, the polybasic acid should be dibasic. Also certain polybasic acids, such as malic and citric, decompose on heating, at least in part, into acids of the maleic type, and the temperature of esterification should be adequate to accomplish the decomposition to a sufficient extent.

Dihydric alcohols are the usual kind of polyhydric alcohols which react with dibasic acids to yield linear molecules or linear polyesters. Diethylene glycol is readily available; others include ethylene glycol, triethylene glycol, trimethylene glycol, monoethylin, and propylene glycol and its derivatives. Ethylene glycol produces a final molding which is very hard but somewhat brittle; triethylene glycol shows softness but greater toughness. A mixture of dihydric alcohols may be used. The reason that dihydric alcohols are preferred is that, with dibasic acids, they yield soluble polyesters of very high molecular weight, and the higher the molecular weight the faster is the cure when mixed with the polymerizable substituted-ethylene compound. A certain amount of an alcohol containing more than two hydroxyl groups (e. g., glycerol) can be used with the dihydric alcohol; also some monohydric or a mixture of higher and lower (monohydric) alcohols, provided the effect of the linear, high-molecular structure is not lost.

A linear structure is preferred since this permits reacting the mixture of maleic material and polyhydric alcohol sufficiently long to obtain an ester of low acid number (high molecular weight) which is soluble. In the final cure the linear molecule is converted by the substituted-ethylene body with which it is mixed to a molecule of the 3-dimensional type (insoluble and infusible) by some form of cross-linkage between the linear molecules. The higher the molecular weight (or the longer the molecule) the more points (maleic double bonds) there are available for cross-linkage. Consequently the cure is faster, the amount of auxiliary body which induces the cross-linkage can be low, and a lower temperature and smaller amount of catalyst is permissible to bring about the change. Also the higher the molecular weight the more viscous is the solution in the substituted-ethylene compound, and this aids in retaining the binder with the filler when the molding composition is subjected to pressure. The cross-linkage causing cure is believed to be a co-polymerization between the glycol maleate and the monomeric resin-forming body. The results, however, are independent of any theory.

The term "linear polyesters" as used herein is defined as chain compounds formed from an alpha-unsaturated dibasic acid and a dihydric alcohol, and may be indicated as follows:

... —M—G—M—G—M—G— ...

where —M— represents an unsaturated dibasic acid residue and —G— represents a dihydric alcohol residue.

When light color is of minor importance the mixture of polyhydric alcohol and maleic material can be heated in an open vessel. However, for light-colored products it is advisable to prepare the ester in an inert atmosphere; that is, carbon dioxide, nitrogen or illuminating gas (free from sulphur compounds) is bubbled through the reaction mixture. This serves to preserve the light color of the ester and assists reaction by removing water as formed. Also, for the lightest color (winter-white) the raw materials are distilled in vacuum and used as soon as possible after distillation. The temperature range in making the ester is in general between about 170° and 230° C. If the temperature is too low the reaction is slow and if too high there is difficulty in stopping the reaction at the desired stage. As soon as the acid number of the product has been reduced to the required point, which is in general below about 60 and preferably between about 5 and 50, the ester product is allowed to cool.

Having prepared the maleic-polyhydric alcohol of sufficiently low acid number, it is incorporated, as above mentioned, with the requisite amount of a monomeric resin-forming body miscible therewith and intended to cause cross-linkage of the maleic ester molecules. Such auxiliary materials as are intended for use with the maleic-polyhydric alcohol ester comprise alpha-substituted ethylene compounds of the general formula $CH_2=CR_1R_2$, where $R_1$ is a negative group such as aryl, vinyl, ethynyl, carboxyl, halogeno, O—CO—alkyl (acyloxy), CO.O.alkyl (carbalkoxy), alkoxy, aldehydo, nitrilo or halovinyl, and $R_2$ is hydrogen or an alkyl group. These compounds are in contrast with maleic acid which is an alpha-beta-substituted ethylene. The unsaturated polybasic acids herein described for reaction with the glycols, may be defined as "ethylene-alpha-beta dicarboxylic" acids. Actually, the number of polymerizable bodies which are utilizable alone is limited by the solubility relations between these compounds and the maleic polyester. The maleic polyesters are miscible with most esters, aldehydes and ketones and less so with ethers and aromatic and chlorinated hydrocarbons. They are substantially immiscible with aliphatic hydrocarbons. Hence, such compounds as coumaron, indene, vinyl acetylene, vinyl chloride, butadiene, isobutene and chloroprene are used in conjunction with miscible compounds such as vinyl esters, acrylic esters, methacrylic esters, vinyl ketones, acrolein and vinyl ethers. Also compositions containing a substantial amount of highly volatile compounds like vinyl chloride are more difficult to mold. Styrene is readily applicable.

The proportion of monomeric substituted-ethylene resin-forming body to be used with the maleic resin depends not only upon miscibility with the unpolymerized material but also upon the homogeneity of the copolymer produced. For example, vinyl acetate is miscible with diethylene glycol maleate in all proportions but the cured product is opaque and shows excess unpolymerized vinyl acetate in mixtures wherein the vinyl acetate is more than about 40%. Methyl methacrylate produces an opaque copolymer unless the amount of diethylene glycol maleate is less than about 10% of the mixture. Methyl acrylate appears to be miscible and to produce clear copolymers with the maleic ester in practically any proportion. Isopropenyl methyl ketone (methylenethyl methyl ketone) is miscible with diethylene glycol maleate in all proportions but requires a maleic resin of very low acid number otherwise the color of the copolymer is dark. Polymerizable vinyl compounds like vinyl acetate and the acrylic and methacrylic esters are more expensive than the maleic esters. Hence I prefer to use the minimum amount of such material which gives satisfactory cure. Keeping the proportion of volatile body low also aids in the molding operation. For diethylene glycol maleate and vinyl acetate a ratio of 88:15 is suitable. Somewhat faster cure is obtained when the proportion of vinyl acetate is increased. Approximately the same ratios hold for the acrylic esters. If slower cure and less firm moldings are permissible, the liquid ethylene compound may be omitted.

The maleic-substituted ethylene composition can be cured without added catalyst but a relatively long time is required. Hence, a curing catalyst is incorporated with the composition in amount, in general, between about .05 and 1% by weight. Curing catalysts include peroxides, ozonides, perhalides, peracids, oxygen and ozone, and their activity is influenced by temperature. Benzoyl peroxide is particularly effective. Acetyl, acetylbenzoyl and phthalyl peroxides are also satisfactory, as well as cyclohexene peroxide and air-blown dioxane. Air or oxygen, particularly in the presence of a soluble cobalt salt, may be bubbled through a liquid composition until an influential amount is absorbed. Stannic chloride shows some activity. It has been found that inorganic peroxides such as those of barium, zinc, magnesium and lead show greatly decreased curing effect over the organic peroxides mentioned. Ammonium persulphate and perchlorate are not curing catalysts but have an antipolymerizing effect. Other anticatalysts for cure at molding temperatures are sulphur, copper compounds, aniline, ethanolamines, resorcinol and hydroquinol. Many dyestuffs also retard cure.

A mixture of maleic glycol resin, alpha-substituted ethylene compound and curing catalyst is not stable at room temperature since it gels on standing. For example, a mixture of 15 parts vinyl acetate, 85 parts diethylene glycol maleate of acid number about 20, and 0.5 part benzoyl peroxide forms a gel overnight. This gel cannot be molded since it does not flow under heat. If the above mixture is to be molded alone, it must be used soon after being prepared. However, it has been found that certain fillers, such as cellulose, asbestos and, to a lesser extent, inorganic powders such as chalk, ground glass and barytes, retard polymerization so that the filled composition may be kept for a relatively long time before being utilized for molding. For example, the above mentioned mixture of vinyl acetate and glycol maleate, when mixed with an equal amount by weight of finely divided cellulose, has been observed to show as good flow under hot-molding, after being kept for a month, as when first prepared. At the same time the presence of the filler does not affect the rapid cure under hot-molding conditions. This feature, as stated previously, constitutes the prime essential of the present invention. Other forms of cellulose fillers include shredded paper and cloth. Chopped canvas yields moldings of high impact strength suitable for bearings or gears. Other fillers include starch and vegetable ivory. Ground polymerized material such as scrap moldings can also be used as a filler, but unless it contains cellulose filler it confers no storage-stability to the composition. Protein substances such as finely divided silk, wool, hair, leather, horn, zein and casein represent fillers of diverse character. Of these, leather is less satisfactory since it retards cure.

Mixing of the stabilizing filler with the liquid which constitutes the binder can be done by any kneading means. Kneading under pressure as in a Banbury machine is very effective, the mixing being continued until the filler is completely wetted by the binder. Enclosed differential rolls can also be used. Heat is preferably not applied during mixing. The binder containing catalyst may be added to the filler or the maleic resin, vinyl compound and catalyst added separately, as desired. Plasticizers, pigments, dyes and perfumes as required are added during the mixing process. As a rule, mold lubricants are not necessary.

By proportioning the filler and in other ways (as by varying the viscosity of the maleic resin by controlling the heat during preparation or by changing the proportion of liquid ethylene compound), molding compositions ranging from viscous liquids or soft pasty masses to almost dry powders may be obtained. One way of molding the composition, preferably in a viscous liquid or soft pasty form easily extrudable under pressure, is to use an injection molding press with the following changes. The magazine which holds the composition is unheated but the mold is heated to a quick-curing temperature (between about 120° and 160° C. depending upon the amount of vinyl acetate and catalyst). The soft composition is injected into the hot die where it solidifies and the molded article is removed from the hot mold as soon as cured, or has set up sufficiently to be handled, in which case the cure is completed by a subsequent baking. The result is a heat-set molded article from which cold flow is absent. In the ordinary procedure for injection molding, which is more generally used with thermoplastics, the magazine is heated to soften the composition therein and the softened material is injected under high pressure into the slightly warm die which is then chilled to solidify the composition. The result is a heat-softenable article.

Although injection molding has been practised with thermosetting compositions, it has been necessary to use slow curing materials of easy flow to prevent cure in the heated magazine, with the result that the composition tends to cure before injection and the cure in the mold is slow. Also with thermosetting compositions, the cured material in the gate and runner and rejects cannot be reused and is wasted. With the compositions of the present invention, gate ends and scrap can be ground up, incorporated with fresh binder and reused. The result of adding finely ground clear scrap to fresh clear binder and molding the mixture is a homogeneous, substantially transparent molded article. Whether the transparency is a result of obtaining uniform optical refractivity throughout the cured mass, or copolymerization between the liquid binder and the surface of the procured particles, is not known.

This method of injection molding can also be applied to other thermosetting compositions which do not require heat to render them flowable under pressure; for example, reaction products of tung oil and a phenol which are treated with an aldehyde to form a viscous, potentially reactive liquid; drying oil-phenol-aldehyde resin varnish bases, such as a tung oil solution of xylenol-formaldehyde resin, mixed with paraformaldehyde; the viscous reaction products of tung oil and polyhydric phenols, such as resorcinol, to which paraformaldehyde is added at ordinary temperature; and potentially reactive phenol-aldehyde resins in the viscous liquid stage.

Also, urea-formaldehyde and phenol-aldehyde molding compositions in a finely divided condition can be made into a pressure-flowable paste with the liquid composition prepared by dissolving a glycol maleate in a vinyl compound. Other thermosetting liquids include the polyhydric alcohol esters of acrylic and methacrylic acids, such as glycol diacrylate.

The compositions can also be molded in an ordinary hot-press. By placing in the hot mold and immediately closing and subjecting to pressure, a heat-cured molding is quickly obtained. Quick-molding temperatures range from about 120° to 160° C. or slightly higher. With a rapid-closing press a surprisingly small amount of the liquid ethylene compound escapes before set-up of the mass occurs, even when a high-volatile compound like vinyl acetate is used. No gas bubbles are formed in the final molding. Curing time depends on the size of the object. On an average the conditions are about 10 seconds for set-up and 2 to 3 minutes for complete cure. Ethylene compounds of higher boiling point such as butyl and amyl acrylate and higher esters offer less chance of escaping during hot-molding than vinyl acetate. In this operation it is preferable to use a granular somewhat dry mass, since loading of the mold is more convenient than with a liquid or a sticky solid. Also, preforms, pellets, pills and like cold-compressed masses permit more rapid introduction of the correct amount of material into the mold to compose the article.

Extrusion to form tubes, rods or sheets is possible by forcing the composition through an extended passage of uniform cross-section and heating a section of the passage along a sufficient length so that the material hardens and emerges as a solid. Cure within the passage need not be complete but merely sufficient to give adequate hardness to prevent flow, cure being subsequently completed in a baking oven.

On account of their high curing rate, particularly the fumarate copolymers, the compositions are particularly useful for articles where high speed of production is essential as in buttons, bottle and collapsible tube closures, slide fasteners and other small objects, these articles being stamped from sheeted filled or pelleted composition under pressure of heated platens. Many other uses will be apparent such as dishes, cutlery and cooking utensil handles, smokers' articles, electrical insulation, dentures, lenses, picture frames, etc., the compositions for these uses being selected according to the desired performance of the molded article. A particular field of usage is where heat and solvent resistance is a feature.

A cure-retarding action at ordinary temperature is also shown by cellulosic sheets such as paper, fiber, canvas, wood and the like. Such structures impregnated with the syrup can be stored as stock under conditions in which evaporation is prevented and when required for fabrication may be placed in superposed layers and united by heat and pressure. Plywood which is waterproof consists of alternate layers of wood-sheet and cured syrup. Being a light-colored binder, the laminated products can be made in any desired color and have decorative practical uses such as for Venetian blind slats, lamp shades, table and bar tops, roofing shingles, and so forth. A layer of the composition herein described can be pressed and cured on wood or other porous base as a veneer.

Plasticizers represent additions which may be made to the compositions to obtain products which are less brittle. Although polyglycols and glycerol are compatible with the copolymer, a water-insoluble plasticizer is generally preferred, such as the phthalate of diethylene glycol monoethyl ether, sucrose octacetate, camphor, diethylene glycol phthalate, glycol succinate, diethylene glycol oxalate and glycol benzoate-phthalate. Liquids such as tricresyl phosphate, triethyl citrate and triacetin are miscible with the unpolymerized composition but produce a white opaque coloration in the final molding and in the absence of filler are useful when opacity is desired.

Another method of influencing the properites of the final polymer is to replace part of the maleic material by another polybasic acid, preferably dibasic such as phthalic, succinic, oxalic, or sebacic acid. As high as two moles of phthalic to one mole of maleic acid can be used and still get satisfactory results. The molded mass is tougher and more flexible and, although the curing time is increased somewhat over the straight maleic product, a judicious amount of phthalic anhydride to form a mixed maleic-phthalic glycol ester serves to lower the cost. Adhesion to glass of the completely cured copolymer of a glycol maleate and vinyl acetate is only slight. Replacing part of the maleic in the alkyd resin by a dibasic acid not of the maleic type (e. g., succinic) increases adhesion to glass so that a layer of the mixed ester resin and vinyl acetate, cured between two sheets of glass, serves as safety glass. For other purposes a part of the maleic may be replaced by a monobasic acid (preferably light colored and heat-stable) such as acetic, benboic, benzoylbenzoic or cinnamic, but in this case the size of the ester molecule is limited since extended chain-growth does not occur at the monobasic acid radicals. When monobasic acids are used it is possible to replace the glycol by glycerol. For example, a monoglyceride of the monobasic acid is provided and this is esterified with the maleic material. Fatty acids of drying oils can be used in this way and the product copolymerized with a miscible vinyl compound.

The following examples illustrate the above. Parts are by weight.

*Example 1.*—Maleic anhydride (500 parts) and diethylene glycol (541 parts) were heated in an oil bath at 220–225° C. for 7 hours, bubbling illuminating gas through the reaction mixture to provide an inert atmosphere. The product was a light-colored viscous liquid of acid number 7.1. Eighty-five parts were thoroughly mixed with 35 parts of vinyl acetate, 0.6 part benzoyl peroxide and 120 parts of alpha cellulose flock in an unheated Banbury mixer. The composition was a soft, crumbly, damp powder which could be formed into pellets by pressure.

When molded at 150° C. and 2000 lb. per square inch for 1 minute, 3 minutes and 5 minutes, the moldings were well formed, very strong, excellently glazed, light colored and translucent. The material set up in 10 seconds. When hot-pressed for only 15 seconds (including set-up time), the composition had set and the objects were well glazed but structurally weak.

After storage at ordinary temperature for six weeks, the composition was molded at 150° C., 2000 lb. per square inch for 2 minutes. The moldings were excellent.

A molded object was immersed in boiling water for 15 minutes. The glaze was slightly dulled, but the material was not softened or weakened. The water absorption was only 1.1 per cent.

*Example 2.*—Diethylene glycol maleate was mixed with vinyl acetate and benzoyl peroxide in the same proportions as in Example 1. On standing overnight the clear liquid changed into a clear, soft, rubbery gel which was insoluble and did not soften appreciably under heat. This indicates the behavior of the composition at ordinary temperatures in the absence of a stabilizing filler.

*Example 3.*—Diethylene glycol maleate as described in Example 1 was mixed with vinyl acetate in the proportions of 85 to 15 parts, and 0.5 part of benzoyl peroxide was added. Seventy parts of this solution and 30 parts of wood flour formed a pasty mass which, when fed into a cold injection cylinder and forced under pressure into a die heated at 150° C., gelled in 1 minute and cured within 3 minutes to a hard molded piece of tan color and good surface.

*Example 4.*—Ethylene glycol (372 parts) and maleic anhydride (588 parts) were heated at 180–200° C. in an atmosphere of carbon dioxide until the acid number was reduced to 25. The product when cooled was a firm, sticky, light-colored solid. Eighty-five parts of the glycol maleate thus prepared were dissolved in 15 parts of vinyl acetate to which was added 0.5 part benzoyl peroxide. Wood flour was then stirred in to form a pasty mass consisting of 30% filler and 70% binder. Gelation occurred in 45 seconds and a hard cure was effected in 3 minutes when the material was injected into dies heated to 150° C. Moldings were tan in color and had good surface.

*Example 5.*—Fifty parts of ethylene glycol maleate (having an acid number of 34 and prepared as in Example 4), 21 parts vinyl acetate, 0.35 part benzoyl peroxide, 70 parts alpha cellulose and 5 parts Prussian blue were thoroughly mixed in an unheated Banbury machine. The composition was molded at 150° C. It set up in about 5 seconds. A pressure of 3000 lb. per square inch was held for 1, 2, and 5 minutes without apparent difference in the resulting moldings. The objects produced were very dark blue, brilliantly glazed, well cured, strong, hard and possessed a very satisfactory appearance. The composition was also molded after a period of 16 days and showed the same molding characteristics.

*Example 6.*—Alpha cellulose was dyed by steeping in a saline solution of Crocein Scarlet, followed by drying at 110° C. Seventy-one parts of the red filler were mixed in a cold Banbury with 50 parts diethylene glycol maleate (described in Example 1), 21 parts vinyl acetate and 0.35 part benzoyl peroxide. The resulting composition was a damp-feeling mass. It was molded at 150° C. under 3000 lb. per square inch. Set-up time was about 15 seconds and cure was effected in 2 minutes. After standing for a week the composition was again molded with the same results.

*Example 7.*—Diethylene glycol (40 parts), triethylene glycol (90 parts), and maleic anhydride (98 parts) were heated together at 180–200° C. in an atmosphere of carbon dioxide until the acid number of the ester was 31.7. The product was a light-colored, viscous liquid. The mixed ester was incorporated with vinyl acetate in the proportion of 85 to 15, and 0.5 part benzoyl peroxide was used as a catalyst. The resin solution was added to wood flour to form a 30% filler composition. On hot-pressing, gelation required 1 minute and cure was effected in 3 minutes at 150° C. Moldings were tan in color and had good surface, though not as hard as those using diethylene glycol alone.

*Example 8.*—Triethylene glycol (600 parts) and maleic anhydride (392 parts) were heated in an atmosphere of carbon dioxide at 160–180° C. until the acid number of the ester was 37. The product was a light-colored, viscous liquid. Fifty parts of the triethylene glycol maleate and 21 parts of vinyl acetate, containing 0.35 part benzoyl peroxide dissolved in it, were mixed in a Banbury with 70 parts of alpha flock and 5 parts chrome yellow pigment. The resulting stiff paste was molded at 150° C. and 3000 lb. per square inch for 5 minutes. The set-up time was about 1 minute and flow was soft. The moldings were brilliant yellow, opaque, very well glazed, hard and strong.

*Example 9.*—Equal parts of diethylene glycol and fumaric acid were heated in a vessel to 210° C. for 3 hours and allowed to cool. Acid number was 52 (bromcresol purple indicator). A mixture consisting of 85 parts of diethylene glycol fumarate, 15 parts vinyl acetate and 0.5 part benzoyl peroxide was prepared. This solution was mixed with wood flour to form a mix containing 30% filler and 70% binder. The material required 30 seconds for gelation and 3 minutes for complete cure. Moldings were hard, uniform, and had good surface. Color was light brown.

*Example 10.*—Diethylene glycol fumarate as prepared in Example 9 (68 parts) was dissolved in 32 parts of vinyl acetate containing 0.5 part benzoyl peroxide. This solution was mixed with 30% wood flour. On injecting the composition into a hot (150° C.) die, gelation occurred in 15 seconds and cure was completed in 2 minutes. Pieces were uniform, hard and brittle.

*Example 11.*—Fumaric acid (116 parts) and diethylene glycol (106 parts) were heated at 210–220° C. for 3 hours in an atmosphere of illuminating gas. The product had an acid number of 17.6. Fifty parts of this resin, 21 parts vinyl acetate, 0.55 part benzoyl peroxide, and 70 parts alpha flock were mixed in a Banbury machine. The composition was molded at 150° C., 3000 lb. per square inch for 2 and for 5 minutes. The set-up was practically instantaneous. The moldings were light colored, somewhat translucent, strong, and well glazed. They contained ridges and cracks, probably caused by curing of those portions in contact with the die before the press could be closed. After the composition had been stored in a closed container for a week, the molding characteristics were unchanged.

*Example 12.*—Fifty parts diethylene glycol maleate (acid number 11), 21 parts vinyl acetate, 0.35 part benzoyl peroxide and 160 parts precipitated chalk were compounded in a Banbury mixer. The product was molded at 150° C., 4000 lb. per square inch for 5 minutes. The flow was hard. The moldings were white, excellently glazed, opaque, very hard (Rockwell K 78), quite brittle and greatly resembled porcelain in appearance, especially when a fracture was examined. After storage for 3 weeks the composition was again molded with the same results.

When the procedure was repeated using 570 parts of barytes instead of the chalk, the moldings were well glazed, light colored hard and strong. The specific gravity was high, being about 2½ times that of a molding containing 50% alpha flock as filler.

A similar composition containing 111 parts asbestos gave moldings which were well glazed, gray colored, very strong, tough and hard. The water absorption after 24 hours soaking in water at room temperature was 2%. After storage for 6 weeks excellent moldings were also obtained.

*Example 13.*—Maleic anhydride (196 parts or 2 moles), phthalic anhydride (148 parts or 1 mole) and diethylene glycol (318 parts or 3 moles) were heated at 220° C. for 13 hours in an inert atmosphere. The product was a light-colored, extremely viscous resin. Fifty parts of the resin, 21 parts vinyl acetate, 0.35 part benzoyl peroxide and 70 parts alpha flock were mixed in a Banbury and molded at 150° C., 3000 lb. per square inch, for 2 and for 5 minutes. Somewhat weak pieces were obtained with a cure of 2 minutes, but strong after 5 minutes.

*Example 14.*—One hundred parts of diethylene glycol maleate resin of acid number 11, 100 parts of alpha flock, 1 part benzoyl peroxide and 2 parts chrome yellow were mixed together in a Banbury mixer. The composition was molded at 150° C. It set up in about 10 seconds. When molded at 3000 lb. per square inch for 2 minutes, the cups obtained were well glazed and somewhat soft when hot. When hot-pressed for 5 minutes, well cured and glazed, flexible, strong moldings were obtained. The water absorption after soaking in cold water for 24 hours was 4.5%. After storage for 2 weeks the molding properties were unchanged.

*Example 15.*—Two hundred fifty parts of a propylene glycol mixture (consisting of 95% propylene glycol, 4% dipropylene glycol and 1% water) and 306 parts of maleic anhydride were heated at 180–200° C. for 3 hours and at 210–220° C. for 2 hours. The product was a light yellow, rather soft, brittle resin. A mixture of 70 parts of the resin, 30 parts vinyl acetate, 0.7 part benzoyl peroxide and 100 parts alpha cellulose flock was mixed in a Banbury machine. The composition was molded at 150° C., 3000 lb. per square inch, for 2 minutes. The moldings were well formed, excellently glazed, light tan colored, strong and well cured.

When 160 parts of corn starch were used in place of the cellulose filler, a pasty composition was obtained. This was molded under the same conditions as above. The flow was soft and the moldings very translucent, light colored and hard but somewhat brittle.

Gum karaya as filler yielded almost transparent moldings which were hard and strong.

*Example 16.*—Seventy parts of diethylene glycol maleate as described in Example 1, 30 parts of ethyl acrylate and 0.75 part of benzoyl peroxide were intimately mixed with 100 parts of finely divided alpha cellulose in a Banbury mixer. The composition thus prepared was slightly sticky and could be compressed into a coherent mass. Molding was carried out at 148° C. and 3000 lb. per square inch for 2 minutes and for 5 minutes. The material set up in about 15 seconds and formed slightly flexible moldings of good surface appearance.

*Example 17.*—Amyl acrylate, a colorless liquid boiling at about 165° C., was prepared by alcoholysis of ethylene cyanhydrin with amyl alcohol. A mixture of 15 parts amyl acrylate, 35 parts diethylene glycol maleate, 50 parts alpha cellulose and 1 part benzoyl peroxide was molded at 150° C., 3000 lb. per square inch, for 2 minutes. The moldings were light tan colored. They were softer and more flexible than when vinyl acetate is used as the copolymerizing body.

*Example 18.*—A mixture of 35 parts diethylene glycol maleate, 15 parts vinyl acetate, 0.25 part benzoyl peroxide, 50 parts alpha cellulose and 100 parts of a commercial urea-formaldehyde molding composition (known as Plaskon, natural color, type G. P. S.) was thoroughly ground together in a Banbury mixer. The composition thus obtained was molded at 150° C., 2000 lb. per square inch for 2 minutes and showed good flow. The moldings were homogeneous, strong, hard and translucent.

*Example 19.*—Fifty parts of the diethylene glycol fumarate described in Example 11 were mixed with 12.5 parts vinyl acetate, 0.3 part benzoyl peroxide and 62 parts alpha cellulose in an unheated Banbury mixer. The composition was rolled out to a compact sheet about ⅛ inch thick and fed between heated platens which stamped out button-shaped pieces. With the platens heated at about 150° C., the composition set up and formed firm molded pieces within 5 seconds. Further hardening occurred when the pieces were baked at 100° C.

*Example 20.*—The diethylene glycol maleate described in Example 1 was mixed with vinyl acetate and catalyst to form a solution containing 30% vinyl acetate and 0.5% benzoyl peroxide. Pieces of canvas were soaked in this somewhat viscous liquid, the excess liquid scraped from the surface and the pieces superposed to form a 12-ply layer which was placed between smooth platens heated to 145° C. Pressure of about 100 lb. per square inch was applied for 20 minutes. The product was a smooth, firmly bonded, tough, machinable structure.

Sheets of paper were treated similarly and formed a light-colored laminated product of high impact strength.

The cured articles illustrated above are insoluble and unaffected by hot or cold water, organic liquids, soap solutions and dilute acids. Extended contact with nitric acid or with concentrated hydrochloric or sulphuric acid causes disintegration. Aqueous alkalies tend to produce discoloration and saponification. Molded articles obtained herein do not soften under heat except to a slight extent. For example, pieces of thin section may be heated in boiling water and bent. When the pressure is released they return to their former shape, but if clamped and allowed to cool under tension the change of shape is retained. Molded dishware or other articles which may be subjected to dampness for protracted periods are preferably prepared from compositions to which are added fungicidal compounds which do not affect cure, such as paraformaldehyde or salicylic acid. With a high content of filler of good heat conductivity such as aluminum powder, vessels may be molded which have such resistance to heat and water that they may be filled with water and boiled to dryness over a free flame.

The molding compositions of the present invention are fast curing and the cured binder consists broadly of a reaction product of a maleic-type polybasic acid, a polyhydric alcohol and a vinyl compound. It is known that a mixture of these reactants can be heated together to form an insoluble-infusible product, or the vinyl compound and maleic anhydride may first be reacted to form a polybasic acid of high functionality which is subsequently reacted with a polyhydric alcohol to form an insoluble alkyd resin, the heat-hardening process in both cases involving relatively slow esterification reactions. However, as shown by the following examples, such procedures are not applicable for the production of molding compositions of the type here described.

*Example 21.*—A mixture consisting of 98 parts maleic anhydride, 86 parts vinyl acetate and 0.6 part benzoyl peroxide was heated on a water-bath to form a hard, transparent, resin-like solid. Sixty parts of this product, 34 parts of diethylene glycol and 94 parts cellulose filler were mixed thoroughly in a Banbury and formed a soft granular composition. A portion was placed in a mold heated to 150° C. and pressed at 2000 lb. per square inch for 5 minutes. The molding was opaque white, soft when hot and hard when cold. On standing, hygroscopic softening occurred. A molded piece immersed in cold acetone slowly disintegrated and the acetone, decanted from the powder, deposited a resinous film on evaporation.

*Example 22.*—Thirty parts of maleic anhydride, 32.5 parts diethylene glycol, 26 parts vinyl acetate, 90 parts alpha cellulose flock and 0.45 part benzoyl peroxide were thoroughly kneaded in a Banbury mixer. The composition was molded at 150° C. When pressure was applied the liquid products began to ooze out and set-up did not occur in 5 minutes, since the liquid squeezed out and vinyl acetate escaped. Even after 15 minutes the material did not cure and the products from pressing consisted mainly of compressed filler. Some viscous liquid covered the die surface as a film.

For molding compositions, therefore, the present invention is dependent on the preliminary reaction of the unsaturated organic acid (e. g. maleic material) and the polyhydric alcohol to form a soluble and fusible ester of high molecular weight as represented by an acid number below about 50, which ester is then converted to the infusible-insoluble stage by treatment with a vinyl compound as described.

*Example 23.*—A viscous diethylene glycol maleate polyester having a very pale yellow color was mixed with styrene containing benzoyl peroxide. The ratio of material used was 40:10:0.5. On pouring this material into a glass test tube and allowing to stand overnight in warm weather the material had set to a solid and could be easily shaken from the test tube in the form of a rod. This rod was further hardened by heating in an oven at 45–50° C. for 48 hours.

*Example 24.*—Propylene glycol maleic polyester was made by heating 1 mole of propylene glycol with 1 mole of maleic anhydride at 190–210° C. until a material resulted which was slightly soft but brittle at room temperature. At about 60° C. this form of the polyester was a viscous liquid which was light yellow in color. 20 parts of the above polyester were mixed with 5 parts of styrene containing 0.25 part of benzoyl peroxide and a sufficient quantity of isopropyl alcohol (approximately 6 parts) to give a somewhat heavy lacquer solution. The solution was poured onto a glass plate and the volatile solvent allowed to evaporate for 2 hours. This produced a tacky film which was thereupon baked at 121-132° C. for about 2½ hours. During the baking stage hardening occurred, yielding a very tough and transparent coating. The adhesion of the film to the glass was reasonably good.

Examples 23 and 24 illustrate the employment of styrene in place of vinyl stock but are not specifically appertaining to molding compositions. The following illustrates a styrene-containing molding composition.

*Example 25.*—30 parts styrene, 70 parts diethylene glycol maleate, 0.5 part benzoyl peroxide and 100 parts alpha flock were mixed in a Banbury mixing machine. The composition was molded at 150° C., 3000 pounds per square inch pressure, for 2 minutes. The moldings were well formed and nicely cured, fairly well glazed, of light color and of excellent translucency when thin sections were viewed through transmitted light. There was no odor of styrene in the cured material.

In my copending application Serial No. 148,733, filed June 17, 1937, I have described and claimed thermosetting compositions comprising a preformed polyhydric alcohol ester of an unsaturated dibasic acid, a liquid monomeric copolymerizing body miscible therewith and a catalyst capable of accelerating curing rate. The appended claims refer to filled compositions.

What I claim is:

1. The process of making a hardened light-colored resinous product which comprises reacting an ethylene-alpha-beta dicarboxylic acid with a glycol, in such proportions that there are present in the reacting mixture, about one carboxyl group in such unsaturated acid to one hydroxyl group in such glycol, to an advanced stage of esterification but short of becoming completely insoluble and infusible, until a product of low acid number is produced which is soluble in a liquid monomeric unsaturated polymerizable compound containing an ethylenic linkage, incorporating the product of such esterification with a liquid monomeric unsaturated polymerizable compound containing an ethyenic linkage, and thereafter subjecting said solution to conjoint polymerization.

2. The process of making a hardened light-colored resinous product which comprises reacting maleic acid with a glycol in such proportions that there are present about one carboxyl group in such maleic acid to one hydroxyl group in such glycol, to an advanced stage of esterification but short of becoming completely insoluble and infusible, until a product of low acid number is produced which is soluble in a liquid unsaturated polymerizable compound containing an ethylenic linkage, incorporating the product of such esterification with said liquid monomeric unsaturated polymerizable compound, and thereafter subjecting said solution to conjoint polymerization.

3. The process of making a hardened light-colored resinous product which comprises reacting an ethylenic-alpha-beta dicarboxylic acid with diethylene glycol in such proportions that there are present about one carboxyl group in such unsaturated acid to one hydroxyl group in such glycol, to an advanced stage of esterification but short of becoming completely insoluble and infusible, until a product of low acid number is produced which is soluble in a liquid monomeric unsaturated polymerizable compound containing an ethylenic linkage, incorporating the product of such esterification with said liquid monomeric unsaturated polymerizable compound, and thereafter subjecting said solution to conjoint polymerization.

4. A process as set forth in claim 1, in which said polymerization step is performed in the presence of a filler which contains cellulose as a substantial component.

5. A resinous material which is substantially identical with the product of the process as set forth in claim 1.

6. A hardened light-colored homogeneous mass, which is insoluble and infusible, and which is substantially identical with the product of the process set forth in claim 2.

CARLETON ELLIS.